(12) United States Patent
Tsuchiya et al.

(10) Patent No.: US 6,546,760 B1
(45) Date of Patent: *Apr. 15, 2003

(54) OPTICAL FIBER DRAWING FURNACE WITH A ZIG ZAG HEATING ELEMENT

(75) Inventors: Ichiro Tsuchiya, Yokohama (JP); Kohei Kobayashi, Yokohama (JP); Hiroaki Ohta, Yokohama (JP); Kazuya Kuwahara, Yokohama (JP); Katsuyuki Tsuneishi, Yokohama (JP); Hideo Miyaki, Yokohama (JP); Yasuo Matsuda, Yokohama (JP)

(73) Assignee: Sumitomo Electric Industries, Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/674,865

(22) Filed: Jul. 3, 1996

(30) Foreign Application Priority Data

Jul. 5, 1995 (JP) .............................. 7-169930
Jan. 31, 1996 (JP) .............................. 8-015280

(51) Int. Cl.⁷ .......................................... C03B 37/029
(52) U.S. Cl. ...................... 65/537; 65/374.15; 219/541; 219/553
(58) Field of Search ..................... 65/537, 488, 374.15; 219/541, 553

(56) References Cited

U.S. PATENT DOCUMENTS 4,547,644 A * 10/1985 Bair ............................ 65/537
4,578,098 A * 3/1986 Paek ........................... 65/537
4,755,658 A * 7/1988 Wilsey

FOREIGN PATENT DOCUMENTS

| FR | 2 374 812 | 7/1978 |
| JP | 52-110926 | 9/1977 |
| JP | 52-110927 | 9/1977 |
| JP | 63-8233 | 1/1988 |
| JP | 1-96042 | 4/1989 |
| JP | 6-227837 | 8/1994 |
| JP | 6-235828 | 8/1994 |
| JP | 7-109143 | 4/1995 |
| JP | 8-59277 | 3/1996 |

OTHER PUBLICATIONS

Patent Abstracts of Japan, vol. 95, No. 008 & JP–A–07 206464 (Furukawa Electric Co Ltd: The), Aug. 8, 1995.

* cited by examiner

Primary Examiner—John Hoffman
(74) Attorney, Agent, or Firm—McDermott, Will & Emery

(57) ABSTRACT

There is provided an optical fiber drawing furnace capable of drawing an optical fiber having small non circularity, which drawing furnace includes a muffle tube, in which an optical fiber preform is supplied, a heater surrounding the muffle tube, a plurality of electrode connecting portion extending from the heater, a plurality of electrodes connected to electrode connecting portions, and in conjunction therewith to an electric power source, and unifying means for unifying the temperature distribution along the circumferential direction.

9 Claims, 10 Drawing Sheets

OPTICAL FIBER DRAWING FURNACE WITH A ZIG ZAG HEATING ELEMENT

BACKGROUND OF THE INVENTION

1. Field of the Invention

The present invention relates to an optical fiber drawing furnace which can draw an optical fiber with small non-circularity.

2. Description of the Related Art

An optical fiber is obtained by heating a perform for optical fiber in an optical fiber drawing furnace to melt and by drawing the molten preform for optical fiber from the lower end thereof. More concretely, as disclosed in Japanese Patent Application Laid-open No. 8233/1988, the optical fiber drawn from the lower end portion of the optical fiber preform is instantly applied a resin protecting layer, such as ultraviolet ray curing resin on the outer periphery by a resin applicator. Furthermore, by passing through a resin curing apparatus, the resin protection layer is cared. Thereafter, the optical fiber is taken up by a take-up machine. On the other hand, by a diameter measuring device provided between the drawing furnace and the resin applicator, a diameter of the optical fiber is measured. Then, a drawing speed of the optical fiber to be drawn from the optical fiber preform is adjusted so that the diameter of the drawn optical fiber is held constant.

On the other hand, when the non-circularity of the optical fiber is large, a diameter of the hole of the optical fiber connector ferrule for setting the optical fiber has to be made greater. When the hole diameter for setting the optical fiber is made greater, an offset between an axis of the hole and an axis of the optical fiber becomes greater to possible cause large connection loss. Similarly, upon mutual connection by mating a pair of optical fibers utilizing a V-shaped groove formed in a positioning block, radius of the optical fiber may fluctuate at the portion contacting with the V-shaped groove. Therefore, the non-circularity of the optical fiber should be a cause of offset of axis upon connection or connection loss.

In order to derive the non-circularity, the diameters of the optical fiber are measured at a plurality of positions in the circumferential direction. With taking the largest diameter among the measured diameters as "longer diameter" and the smallest diameter as "shorter diameter". Then, the non-circularity can be expressed by (longer diameter-shorter diameter)/average diameter. In general, assuming that the maximum diameter of the objective circularity is $D_1$ and the minimum diameter is $D_2$, the non-circularity $\epsilon$ is expressed by the following equation.

$$\epsilon=\{2\times(D_1-D_2)/(D_1+D_2)\}\times 100(\%)$$

Conventionally, in order to reduce the non-circularity to zero percent as close as possible, the lower end of the optical fiber preform is matched with the center of the furnace to uniformly heat the optical fiber preform along the circumferential direction thereof. On the other hand, as disclosed in Japanese Patent Application Laid-open No. 96042/1989, there has been proposed a technology for solving a problem of temperature fluctuation by rotating a muffle tube. Also, as disclosed in Japanese Patent Application Laid-open No. 227837/1994, there has been a proposal for reducing non-circularity by restricting temperature fluctuation along the circumferential direction of the heater by extending a pair of electrode connecting portions opposing with an angle of 180 degrees interval to the outer peripheral well of the furnace body and connecting electrodes to the tip ends of the electrode connecting portions.

One example of sectional structure of such conventional drawing furnace is shown in FIG. 9 and the external view of the heater of the conventional drawing furnace is illustrated in FIG. 10. As shown, in a center portion of a furnace body 102, a cylindrical muffle tube 103 is assembled. Also, between the center portion of the furnace body 102 and the muffle tube 103, a heater 104 of cylindrical configuration as a whole is diagnosed. Surrounding the heater 104, a heat insulator 101 is set. By the heater 104, a lower end portion of the optical fiber preform (not shown) supplied into the muffle tube 103 is heated for melting. Then, the molten portion of the optical fiber preform is drawn from the lower end of the furnace body 102 as an optical fiber.

The heater 104 has a heating portion 105 meandering in vertical direction and formed in to a cylindrical configuration as a whole, and a set of two electrode connecting portions 106 and 107 mutually offset with an angle of 180 degrees interval in circumferential direction of the heating portion 105. These one set of the electrode connecting portions 106 and 107 are extended from the upper end of the heating portion 105 to radially project outwardly. To these one set of the electrode connecting portions 106 and 107, one set of electrodes 108 and 109 lead outside of the furnace body 102 are connected via connecting members 110. These electrodes 108 and 109 are connected to a single phase AC power source 113 via a transformer 111 and a power control unit 112. A current supplied from the single phase AC power source 113 via the power control unit 112 passes through the heating portion 105 via the connecting member 110 and one of the electrode connecting portion 106 from one of the electrode 100 and flows to the connecting member 110 and the other electrode 109 from the other electrode connecting portion 107, or flows in opposite direction to heat the heating portion 105

In the recent years, associating with lowering of cost of the optical fiber, the optical fiber preform is becoming into greater diameter and drawing speed is becoming higher. On the other hand, the drawing furnace per se inherently cause certain non uniformity of the temperature in the circumferential direction due to presence of electrodes, cooling water flow and so forth, for example. Non-uniformity of temperature distribution in the circumferential direction becomes more significant is greater diameter of the optical fiber preform than that smaller diameter to cause more significant temperature fluctuation within the optical fiber preform. Furthermore, when the optical fiber is drawn at higher speed than that in the prior art, a period to pass a neck down portion becomes shorter where the optical fiber preform is molten and reduced in diameter. This results in difficulty of reduction of the temperature fluctuation to increase tendency of increasing of non-circularity.

On the other hand, in case of the method, in which the muffle tube is rotated as disclosed in Japanese Patent Application Laid-open No. 96042/1989, the temperature fluctuation of the optical fiber preform is advantageously reduced to permit reduction of the non-circularity of the optical fiber. However, on the other hand, by rotation of the muffle tube, flow of a gas within the furnace is disturbed to make fluctuation of the diameter of the optical fiber greater. As a result, upon connection by means of an optical connector or by mutually melting the connecting ends, connection loss can be increased.

Furthermore, the method to extend a pair of electrode connecting portions to the outer periphery of the furnace body as disclosed in Japanese Patent Application Laid-open No. 227837/1994, is advantageous in that the temperature fluctuation in the circumferential direction of the heater can be improved in comparison with the prior art. However, there still present a difference of temperature between the atmosphere in the vicinity of the electrode connecting portions opposing with an angle of 180 degrees interval and the atmosphere in the direction perpendicular to the opposing direction of the electrode connecting portions to possible make cross section of the obtained optical fiber somewhat elliptic.

SUMMARY OF THE INVENTION

It is therefore an object of the present invention to provide an optical fiber drawing furnace which makes it possible to draw an optical fiber with smaller non-circularity.

According to the first aspect of the present invention, an optical fiber drawing furnace comprises:

a muffle tube, in which an optical fiber preform is supplied;

a heater surrounding the muffle tube;

a plurality of electrode connecting portion extending from the heater, and connecting to an electric power source via a plurality of electrodes; and unifying means for unifying the temperature distribution along the circumferenetial direction of the heater.

With the first aspect of the present invention, since the unifying means is provided, the temperature distribution along the circumferential direction of the heater can be made uniform. As a result, non-circularity of the optical fiber can be made smaller in comparison with the optical fiber drawn by the conventional drawing furnace. Therefore, high quality optical fiber with lesser connection loss can be obtained.

According to the second aspect of the invention, an optical fiber drawing furnace comprises:

a muffle tube, in which an optical fiber preform is supplied;

an inner heater surrounding the muffle tube;

a pair of inner electrode connecting portions extending from the inner heater, arranging in opposition to each other across the inner heater and connecting to a power source via a pair of electrodes, an outer heater surrounding the inner heater, and a pair of outer electrode connecting portions extending from the outer heater, arranging in opposition to each other across the outer heater in a direction perpendicular to opposing direction of the pair of inner electrode connecting portions and connecting to the power source via a pair of electrodes.

In the second aspect of the invention, since the opposing direction of a pair of electrode connecting portions projected from the inner heater and the opposing direction of a pair of electrode connecting portions projected from the outer heater are intersecting to each other, the temperature distribution along circumference of the muffle tube can be unified by the inner and outer heaters. As a result, it becomes possible to make the non-circularity of the optical fiber smaller than that in the prior art. Thus, a high quality optical fiber with small connection loss can be obtained.

In either aspect of the invention, the lower end of the optical fiber preform is heated by the heater and softened. By drawing the softened portion, the optical fiber is drawn continuously.

In the first aspect of the optical fiber drawing furnace according to the invention, the unifying means varying cross sectional area of the current path of the heater along the circumferential direction of the heater, or varying the path length in the longitudinal direction of the heater along the circumferential direction may be employed.

On the other hand, the unifying means may include the electrode in number of integer multiple of two arranged along circumferential direction of the heater with substantially equal intervals, and the electrode connecting portions in number of integer multiple of two but not smaller than four arranged along circumferential direction of the heater with substantially equal intervals. In such case, it is preferred that the power source is a single phase AC power source. Similarly, the unifying means may include the electrodes in number of integer multiple of three arranged along circumferential direction of the heater with substantially equal intervals, and the electrode connecting portions in number of integer multiple of three arranged along circumferential direction of the heater with substantially equal intervals, and, in such case, the power source may be a three phase AC power source.

The plurality of electrode connecting portions may be respectively connected with the electrodes. In such case, it is preferred that the unifying means includes two of the electrodes, the electrode connecting portions in number of integer multiple of two but not smaller than four, and connecting elements respective connecting half in number of the electrode connecting portions, the connecting elements being respectively connected to the electrodes When the electrode connecting portions in greater number than that of the electrodes are provided, or when three or more electrodes are provided, temperature distribution along the circumferential direction of the heater can be made further uniform.

Furthermore, it is possible that resistance values of a plurality of current paths from one of the electrode to the other of electrode are set to be equal to each other. For this purpose, it is effective to form the heater of graphite. In this case, temperature distribution along the circumferential direction of the heater can made further uniform.

In the second aspect of the optical fiber drawing furnace, it is effective to vary cross sectional area of a current path for the heater along circumferential direction of the heater or to vary a path length in a longitudinal direction of the heater along the circumferential direction.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DETAILED DESCRIPTION OF THE PREFERRED EMBODIMENTS

Several embodiments of an optical fiber drawing furnace according to the present invention will be discussed hereinafter with reference to FIGS. 1 to 8.

Figure 1:
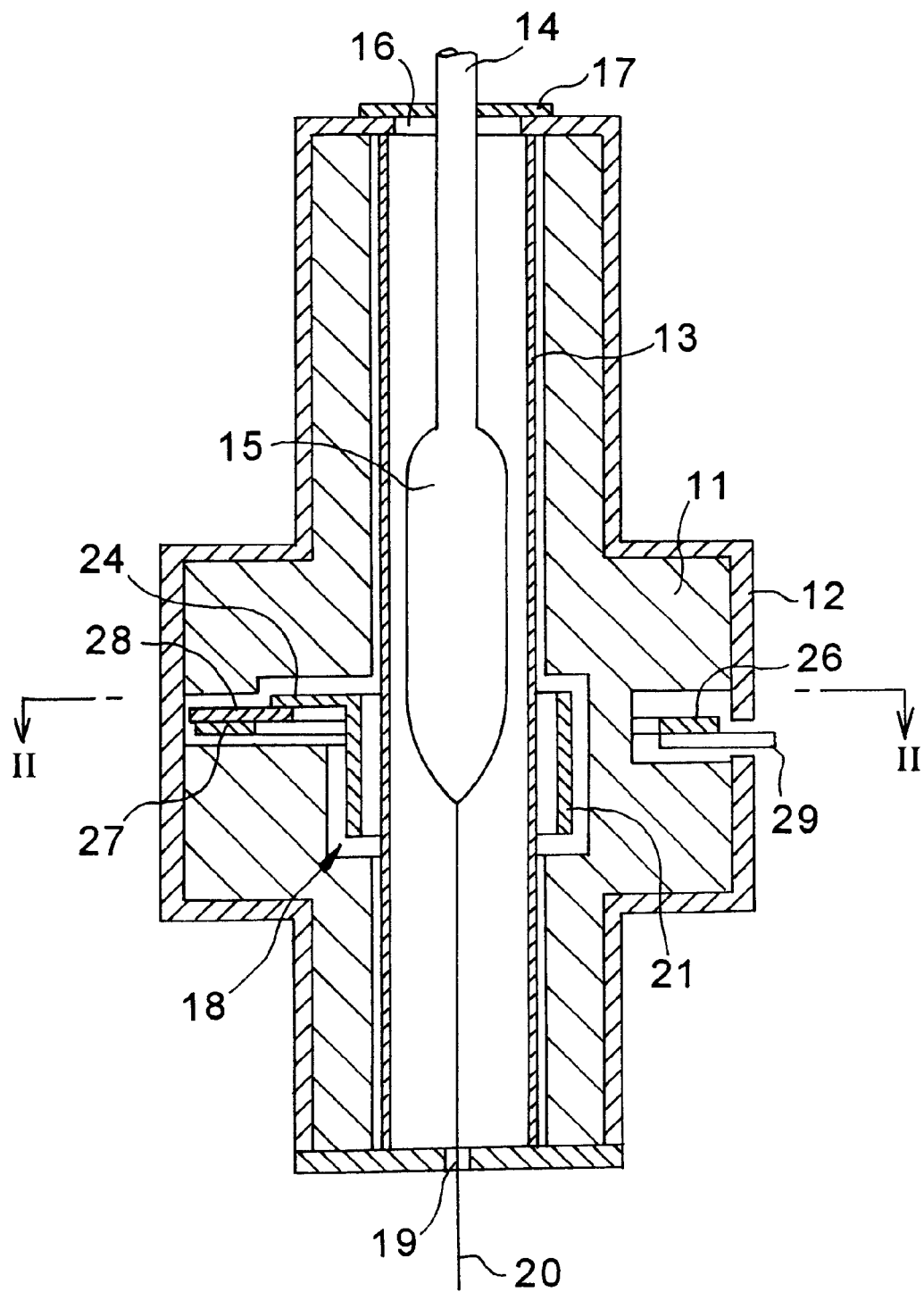
FIG. 1 is a section showing general structure of the first embodiment of an optical fiber drawing furnace according to the first aspect of the present invention, in which is illustrated a condition developed along a plane identified by arrow I—I of FIG. 2.
Figure 2:
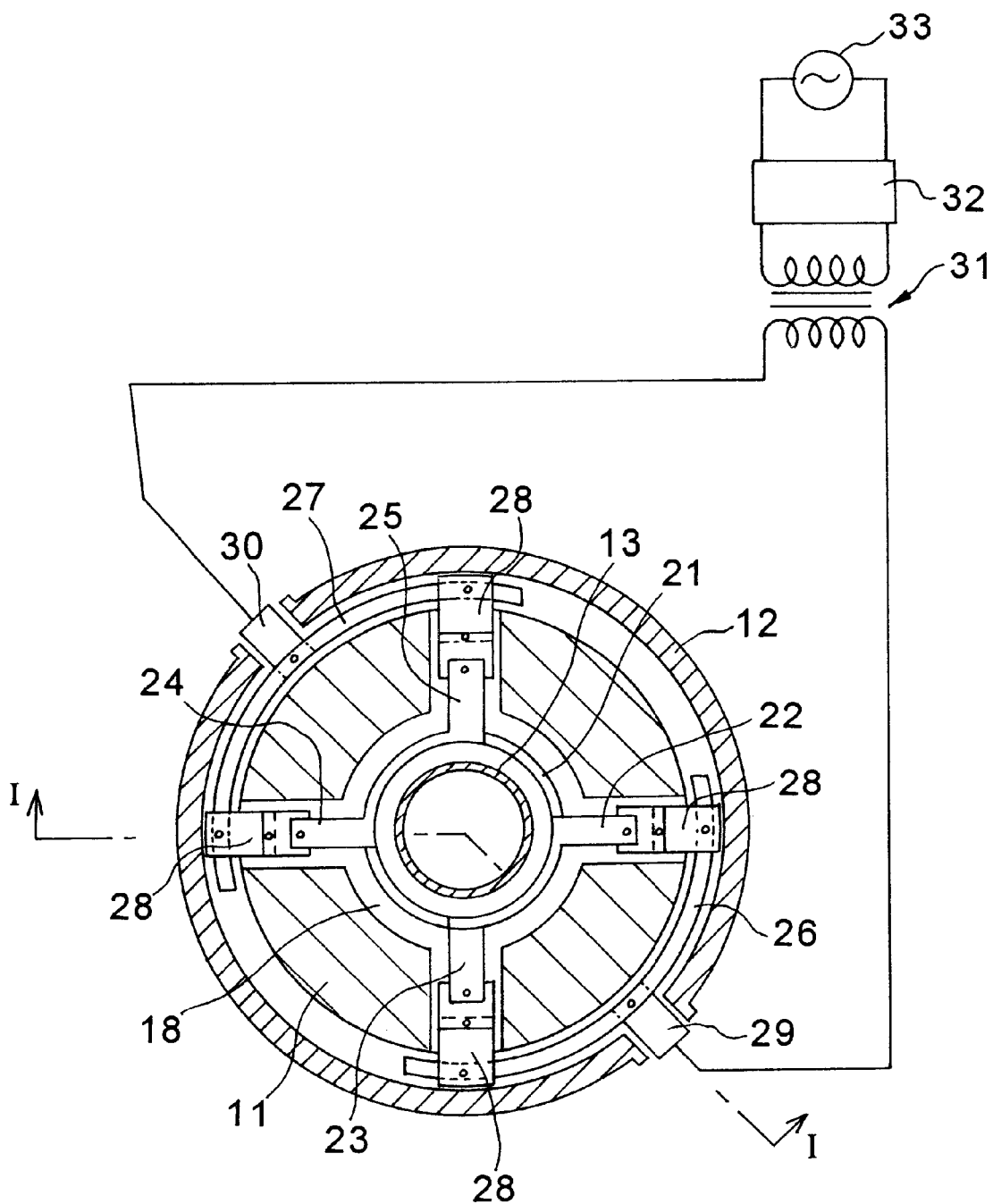
FIG. 2 is a conceptual illustration of the overall optical fiber drawing furnace, along arrow II—II or FIG. 1.

A sectional structure of one embodiment of an optical fiber drawing furnace according to one aspect of the invention is shown in FIG. 1 and a sectional structure as viewed along arrow II—II is shown in FIG. 2. Namely, in the center portion of a furnace body 12 having a heat insulator 11 therein, a cylindrical muffle tube 13 is assembled. Into the muffle tube 13, an inert gas, such as nitrogen, helium or so forth is supplied from a not shown inert gas supply source. In the muffle tube 13, an optical fiber preform 15 is hanged by a supporting bar 14. The optical fiber preform 15 is inserted into the muffle tube 13 through an opening portion 16 formed at the upper end of the furnace body 12. Then, the opening portion 16 is closed by a sealing plate 17, through which a supporting bar 14 extends slidingly. Also, between the center portion of the furnace body 12 and the muffle tube 13, a heater 10, such as a graphite heater, in cylindrical configuration as a whole, is provided. By the heater 18, the lower end portion of the preform 15 for the optical fiber is heated. Then, the molten optical fiber preform 15 is drawn through an opening 19 formed at the lower end of the furnace body 12 as an optical fiber.

Figure 3:
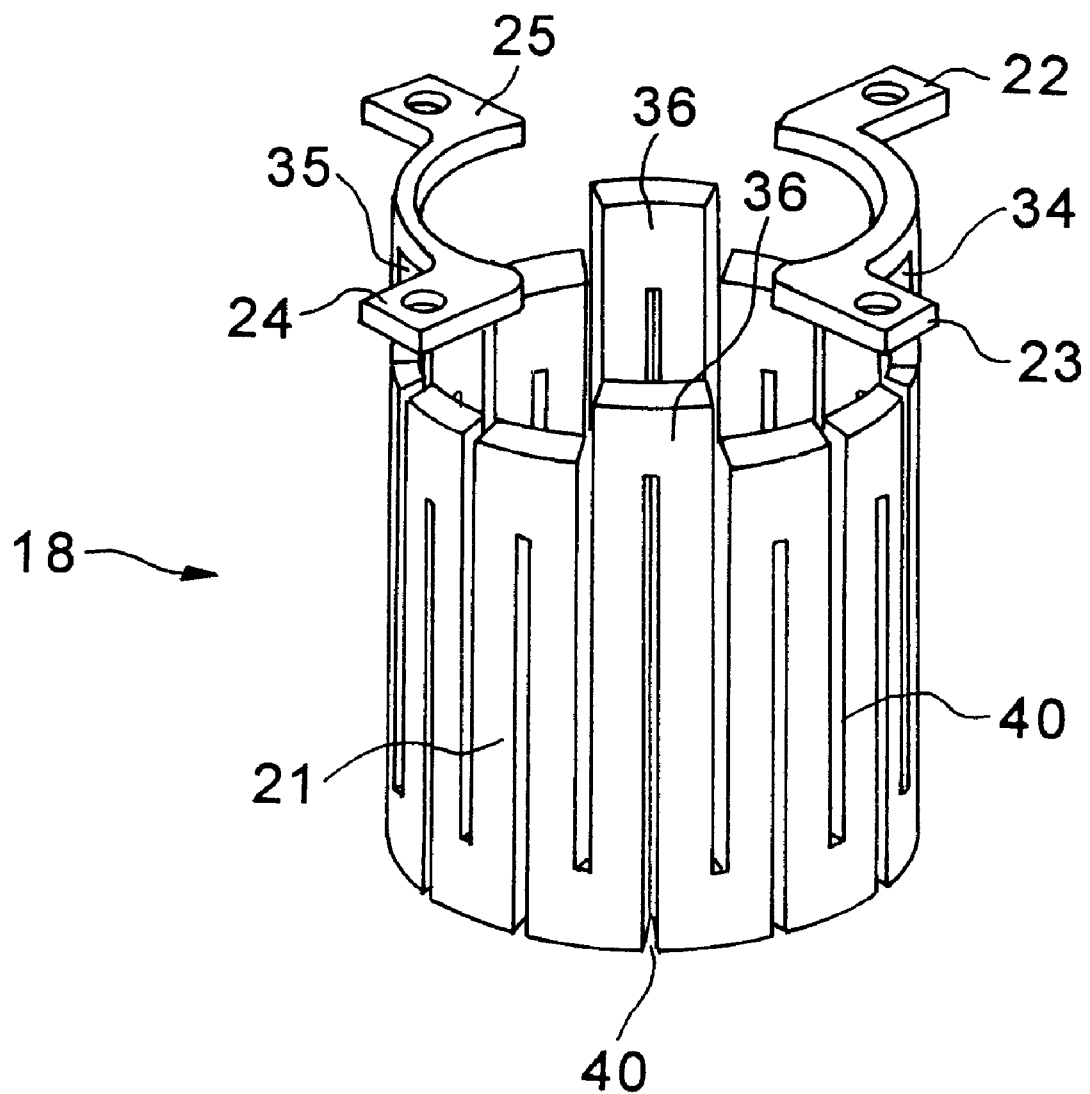
FIG. 3 is a perspective view showing an external appearance of a heater to be employed in the first embodiment of the optical fiber drawing furnace of FIGS. 1 and 2.

The external appearance of the portion of the heater 18 in the shown embodiment will be illustrated in FIG. 3. Namely, the heater 18 in the shown embodiment includes a heating portion 21 which meanders in vertical direction and is formed cylindrical configuration as a whole, a pair of support column portions 34 and 35 rising from the upper end of the heating portion 21 for opposing with an angle of 180 degrees interval in circumferential direction of the heating portion 21, and electrode connecting portions 22 to 25 respectively split into two fractions along the circumferential direction of the heating portion 21 from the upper end of a pair of support column portions 34 and 35 and radially extend from both ends of the split fractions. Also, all of these are formed of graphite.

In the shown embodiment, at the intermediate portion along the circumferential direction of the heating portion 21 between a pair of support column portions 34 and 35, an extension 36 is formed by setting the height along longitudinal direction (vertical direction in FIG. 3) of the heat generating portion 21 longer than other portion. For establishing heat balance with the support column portions 34 and 35, uniform temperature distribution is realized along circumferential direction and height direction of the overall heater 18. On the other hand, the thickness of the heating portion 21 of the heater 18 and the thickness in the radial direction are set to be uniform at every portions.

Furthermore, a width in the circumferential direction of a cut-out column portion 40 defining a current passage of the heating portion 21, is set uniformly.

Thus, when an extension 36 is formed in the heating portion 21 positioned between the support column portions 34 and 35 adjacent in the circumferential direction in order to reduce influence of heating by the support column portions 34 and 35 connected to the electrode connecting portions 22 to 25, temperature distribution of the heater 18 in the height direction can be uniformed to make it possible to obtain high quality optical fiber 20 with small connection loss.

On the other hand, the electrode connecting portions 22 to 25 are connected to both ends of a pair of quarter-circular connecting elements 26 and 27 via connecting members 28. At the center portions of pair of these connecting elements 26 and 27, a pair of electrodes 29 and 30 lead outside of the furnace body 12 are connected, respectively. These two sets of electrodes 29 and 30 are connected to a single these AC power source 33 via a transformer 31 and a power control unit 38. A current flows from one electrode 29 to the other electrode 30 via one connecting element 26, the connecting member 28, one electrode connecting portions 22 and 23, one support column portion 34, the heating portion 21, the other support column portion 35, the other electrode connecting portions 24 and 25, the connecting member 28 and the other connecting element 27, or vis-a-vis.

In the shown embodiment, portions of the current path combined at the support column portion 34 from the electrode 29 through two electrode connecting portions 22 and 23, portions of the current path passing the heating portions 21 in clockwise direction and counterclockwise direction between the support column portions 34 and 35, and portions of the current path combined at the electrode 30 from the support portion 35 through two electrode connecting portions 24 and 25 are set geometrically symmetric to one another, respectively.

By establishing portions of the branching current path geometrically symmetric to each other, fluctuation of resistance value of respective current paths can be only fluctuation of the resistance values of the materials to be used. In this case, graphite is easy to restrict the fluctuation of resistance value to be less than or equal to 5%. Thus, it is quite effective for forming the heater 18 with graphite.

The current supplied from the single phase AC power source 33 via the power control unit 32, flows from one electrode 29 to the other electrode 30 via one connecting element 26, the connecting member 28, one electrode connecting portions 22 and 23, one support column portion 34, the heating portion 21, the other support column portion 35, the other electrode connecting portions 24 and 25, the connecting member 38 and the other connecting element 27, or vis-a-vis. In this case, by setting the path area of the current path formed the heating portion 21 smaller than other portion constructing the heater 18, such as the electrode connecting portions 22 to 25, heat generation amount at the heating portion 21 can be increased.

Figure 4:
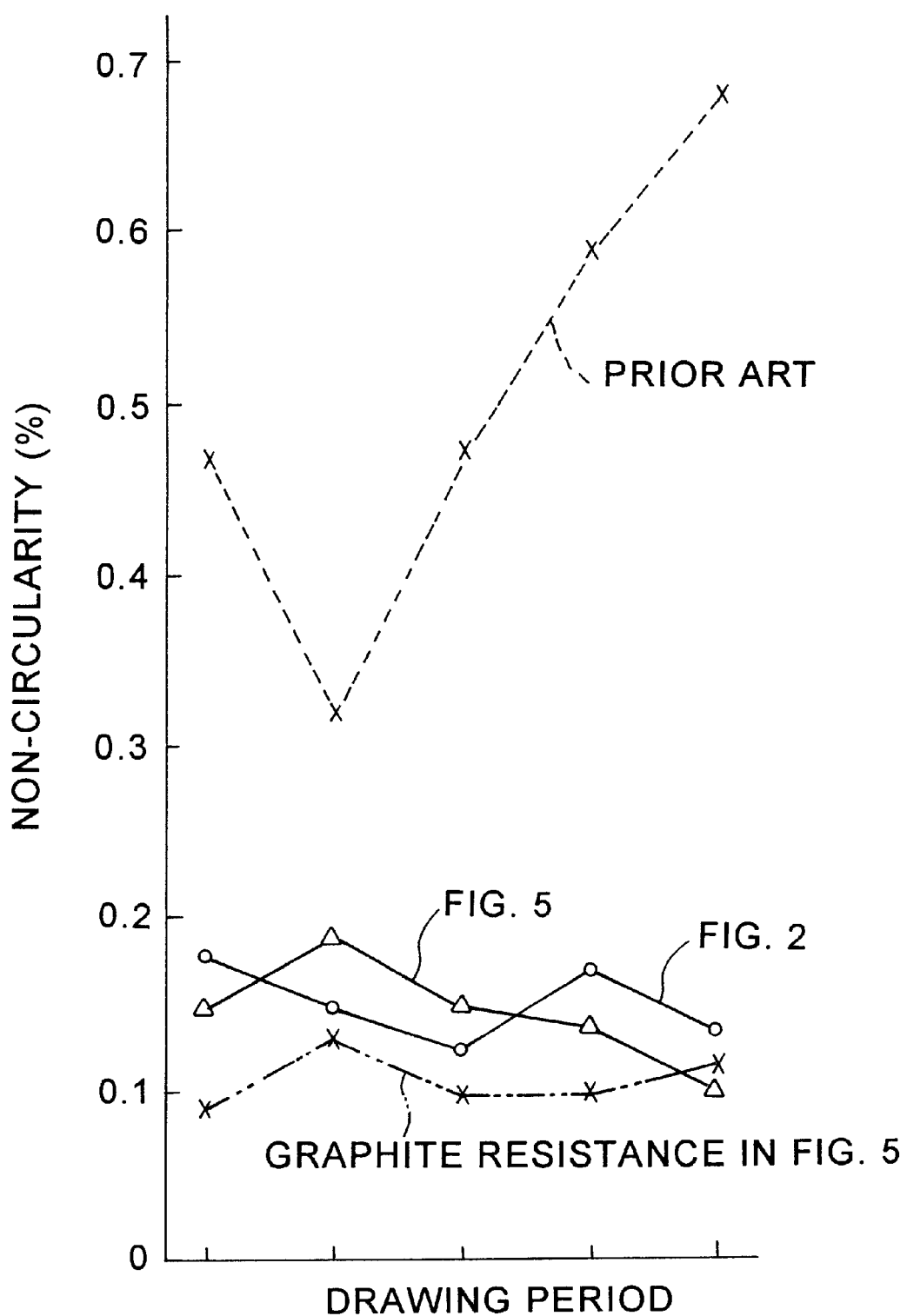
FIG. 4 is a graph showing a relationship between an elapsed time in drawing and non-circularity.
Figure 9:
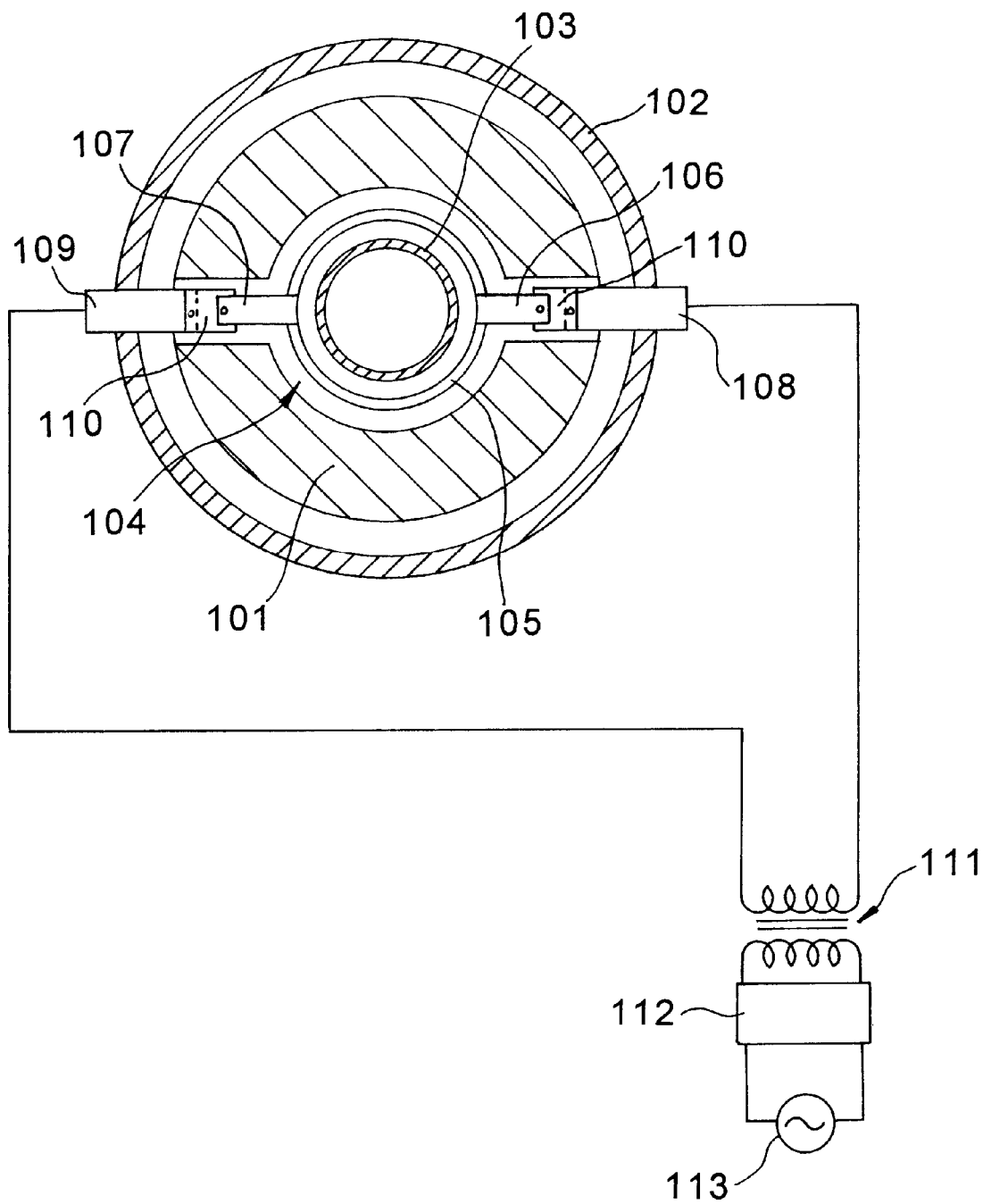
FIG. 9 is a conceptual illustration showing general construction of the conventional drawing furnace.
Figure 10:
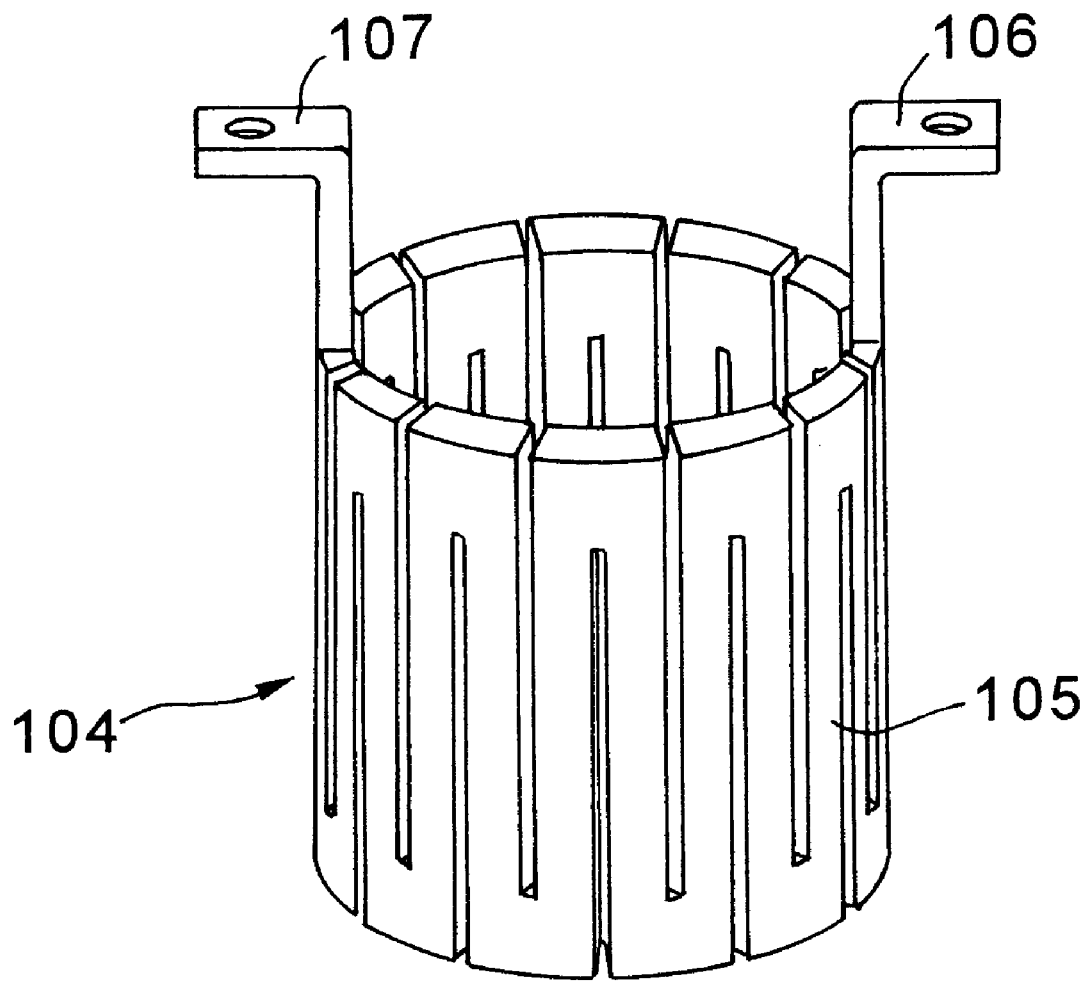
FIG. 10 is a perspective view showing the external appearance of the heater to be employed in the conventional drawing furnace.

In the shown embodiment, four connecting portions between the electrode connecting portions 22 to 25, and the connecting members 28 and the electrodes 29 and 30, where large amount of heat is transferred, are arranged at equal internal along the circumferential direction of the heating portion 21. Therefore, in comparison with the case where the conventional heater 104 including a pair of the electrode connecting portions 106 and 107 arranged with an angle of 180 degrees, more uniform temperature distribution in the circumferential direction can be obtained by the heater 18. A relationship between the elapsed time in drawing operation and non-circularity is shown in FIG. 4. As can be apparent from FIG. 4, the non-circularity ε of the optical fiber 20 over the entire length of the preform 15 for the optical fiber can be restricted to be less than 0.2%, for example. As a result, in connection with the conventional drawing furnace shown in FIGS. 9 and 10, in which the non-circularity ε can be in the order of 0.3 to 0.7%, deviation from circularity of the optical fiber 20 is improved and kept constant.

It should be noted that since the support column portions 34 and 35 are set the cross sectional area of the current path wider than that in the heating portion 31, heat generation amount becomes relatively small. However, since the support column portions 34 and 35 per se generates a heat in certain amount, and since heat is transferred from the heating portion 21, temperature fluctuation tends to be caused between the portions in the vicinity of the support column portions 34 and 35 and the portion distanced from the support column portions 34 and 35 in circumferential direction. Thus, by forming extensions 36 extending in circumferential direction for the support column portions 34 and 35 in perpendicular direction thereto, unbalance in temperature in the circumferential direction is corrected to make temperature distribution of the heater 18 along circumferential direction uniform at any height positions.

Unless uniformity of the temperature distribution in the circumferential direction of the heater 18 being established at any height positions, the following problem will be arisen. Namely, the temperature distribution of the drawing furnace is influenced by the configuration of the optical fiber preform 18 within the drawing furnace. However, since the optical fiber preform 15 causes variation of configuration associated with progress of drawing operation, if the temperature distribution in the circumferential direction is not uniform in all of the height positions in the heater 18, the influence of non-uniformity of the temperature distribution can be varied depending upon the length of the optical fiber preform 15 associated with progress of drawing operation. It is quite effective to establish uniform temperature distribution by forming the extensions 36, which temperature distribution can not be uniform in the circumferential direction due to presence of the support column portions 34 and 35 otherwise, for making temperature distribution uniform in circumferential direction, irrespective of progress of the drawing operation for the optical fiber preform 15.

In the foregoing embodiment, respective two electrode connecting portions 22 to 25 are formed for respective of the support column portions 34 and 35. However, it is naturally possible to form the support column portions 34 and 35 for each of the individual electrode connecting portions 22 to 25.

Figure 5:
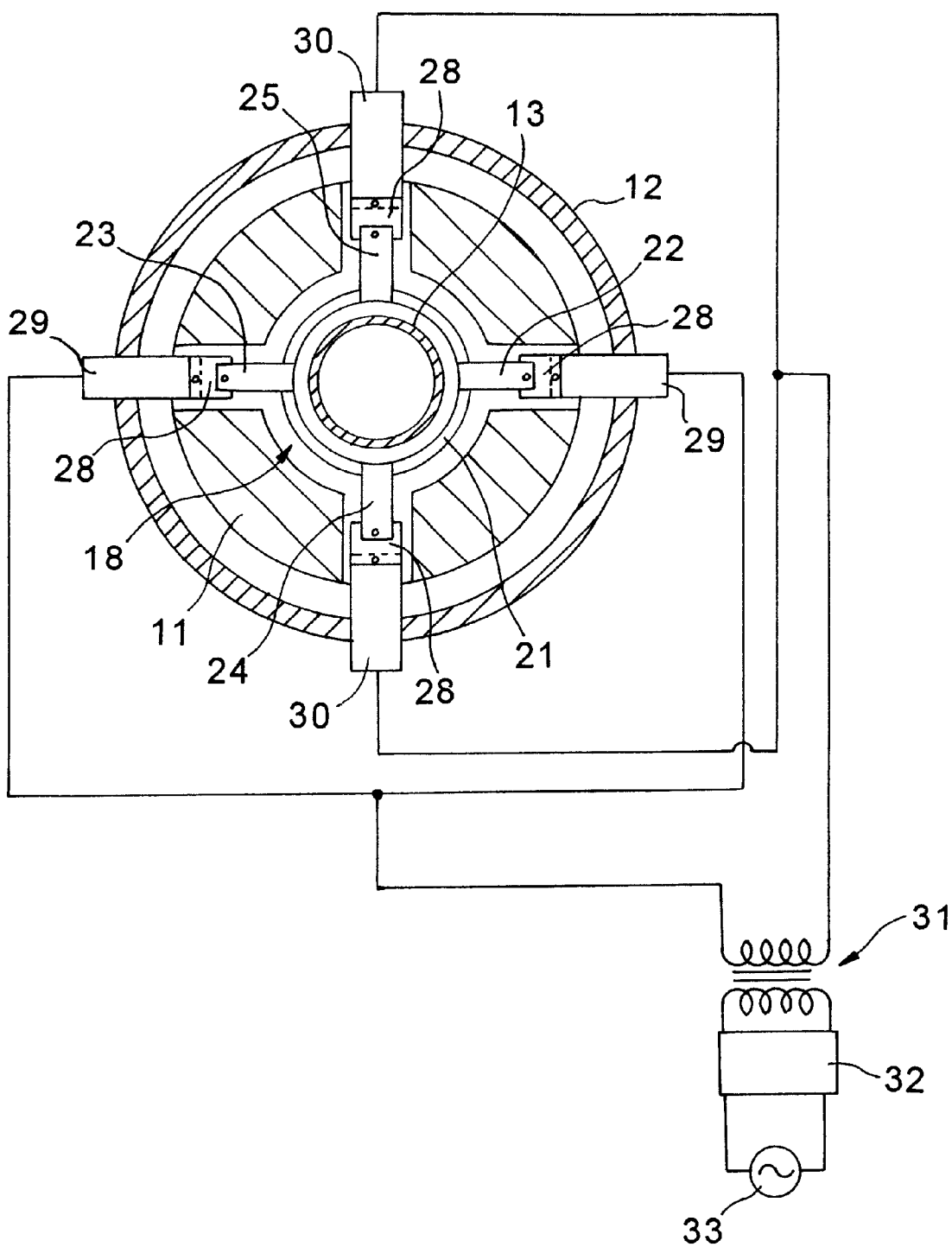
FIG. 5 is a conceptual illustration showing another embodiment of the optical fiber drawing furnace according to the present invention.
Figure 6:
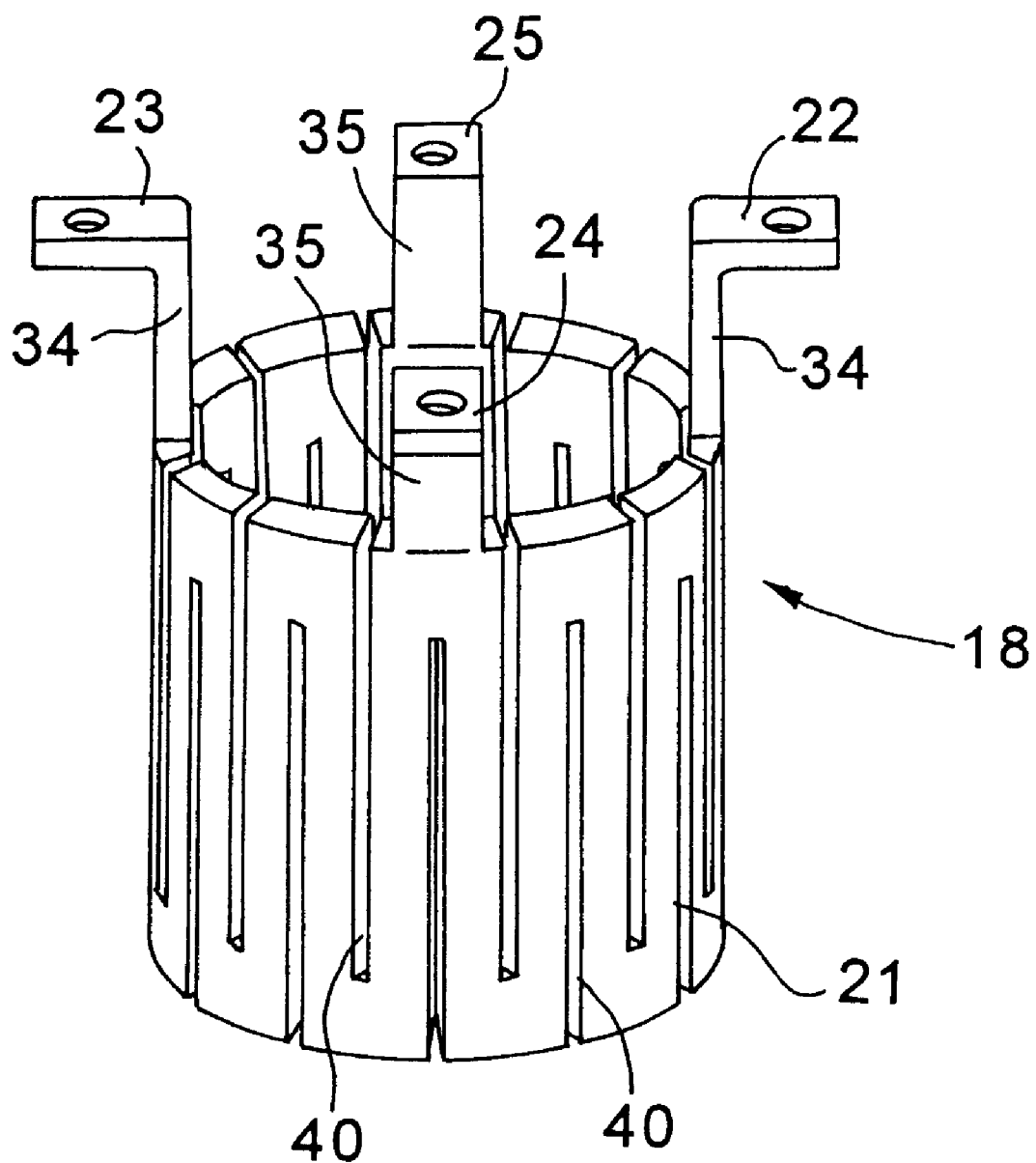
FIG. 6 is a perspective view showing external appearance of the heater in the embodiment shown in FIG. 5.

The sectional structure of such second embodiment of the optical fiber drawing furnace according to the present invention is shown in FIG. 5, and the external appearance of the heater to the employed in the second embodiment is shown in FIG. 6. It should be noted that respective of functional components similar to the former embodiment will be represented by the same reference numerals and discussion therefore will be neglected in order to keep the disclosure simple enough to facilitate better understanding of the invention.

The heater 18 in the shown embodiment includes two sets of four support column portions 36 and 35 extending upwardly and electrode connecting portions 22 to 25 extending radially outward from the upper ends of the support column portions 34 and 35 The four support column portions 34 and 35 in two sets are arranged with an angle of 90 degrees intervals in the circumferential direction of the heating portion 21. All of these components in the drawing furnace are formed of graphite. For these electrode connection portions 22 to 25, two sets of four electrodes 29 and 30 which are lead outside of the furnace body 12 are connected via the connecting members 28.

On the other hand, an impedance of each cable from the transformer 31 to the two electrodes 29 are matched with each other. Similarly, the impedance of each cable extending from the transformer 31 to two electrodes 30 is also matched. Furthermore, four current paths from respective electrodes 29 to two electrodes 30 via two electrode connecting portions 22 and 23, two support column portions 34, respectively one fourth of the heating portion 21, two support column portions 35 and two electrodes connecting portions 24 and 25 are set geometrically symmetric. By this, fluctuation of the resistance values of respective current path can be only fluctuation of the resistance valve of the materials to be used. In this case, since graphite is easy to restrict the fluctuation of the resistance value less than or equal to 5%, it is quite effective to form the heater 18 by graphite.

In the shown embodiment, similarly to the former embodiment, four connecting portions between the electrode connecting portions 22 to 25, and the connecting member 28 and the electrodes 29 and 30 are arranged at equal angular interval in the circumferential direction. Therefore, in comparison with the case where the conventional heater 104 including a pair of the electrode connecting portions 106 and 107 arranged with an angle of 180 degrees, more uniform temperature distribution in the circumferential direction can be obtained by the heater 18. A relationship between the elapsed time in drawing operation and non-circularity is shown in FIG. 4. As can be apparent from FIG. 4, the non-circularity ε of the optical fiber 20 over the entire length of the preform 15 is for the optical fiber can be restricted to be less than 0.2%, for example. As a result, in comparison with the conventional drawing furnace shown in FIGS. 9 and 10, in which the non-circularity ε can be in the order of 0.3 to 0.7%, deviation from circularity of the optical fiber 20 is improved and kept constant.

Next, in the embodiment shown in FIGS. 5 and 6, electrical resistances between terminals of the heater 18, namely between the electrode connecting portion 22 and the electrode connecting portion 24, between the electrode connecting portion 22 and the electrode connecting portion 25, between the electrode connecting portion 23 and the electrode connecting portion 24 and between the electrode connecting portion 23 and the electrode connecting portion 25 are adjusted to be less than or equal to 2.2% in order to correct fluctuation of the resistance of the graphite per se. In the shown embodiment, since the resistance value between respective terminals is set at 0.09 ohms, the fluctuation of the resistance value is adjusted to be less than or equal to $2\times10^{-3}$ ohms. In concrete, by setting the wider width of the cut-out portion 40 of the heating portion 21 located between terminals having small resistance values, resistance is adjusted to be greater. In this case, similar effect may be obtained by making thickness of the heating portion 21 thinner in stead of widening the width of the cut-out portion 40. As a result, as shown by two-dotted line, the non-circularity ε in the entire length of the optical fiber 20 could be restricted to be less than 0.15%.

It should be noted that, in the embodiment set forth above, the overall resistance of the heater 18, to which the cable is connected was 0.03 ohms.

While the foregoing two embodiments formed two sets of four electrode connecting portions 22 to 25 at the upper end of the heating portion 21, it is possible to form the electrode connecting portions 22 to 25 at the lower end of the heating portion 21. In the alternative, it is of course possible to provide three or more sets of electrode connecting portions. Also, when three-phase AC power source in place of the single phase AC power source, the electrode connecting portions and the electrodes are formed in number of integer multiple of three, the electrode portions are connected to one of the three power source terminals so that uniform current may be supplied to respective electrode connecting portions.

Figure 7:
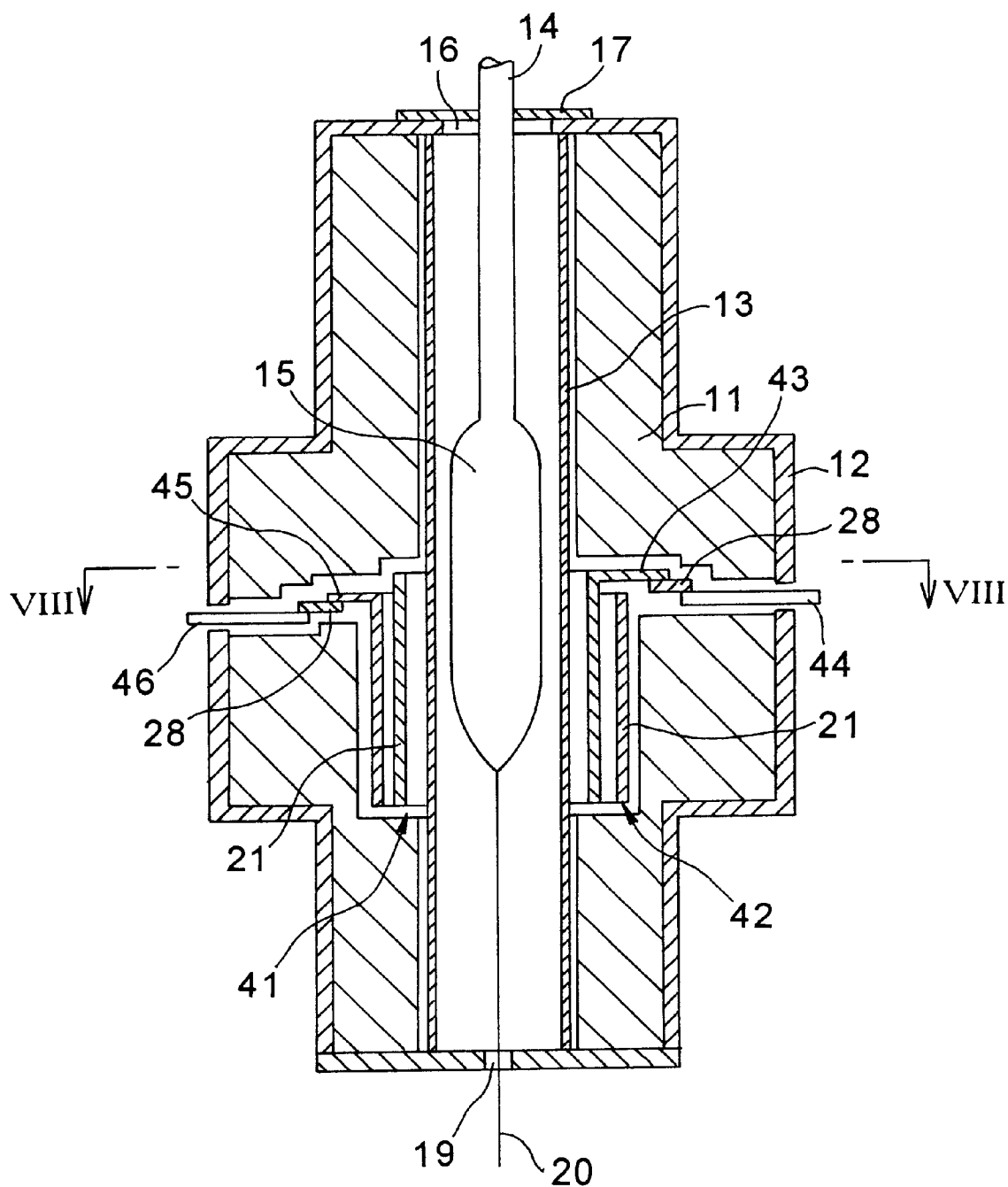
FIG. 7 is a conceptual illustration of a further embodiment of the optical fiber drawing furnace according to the present invention, in a condition developed along arrow VII—VII of FIG. 8.
Figure 8:
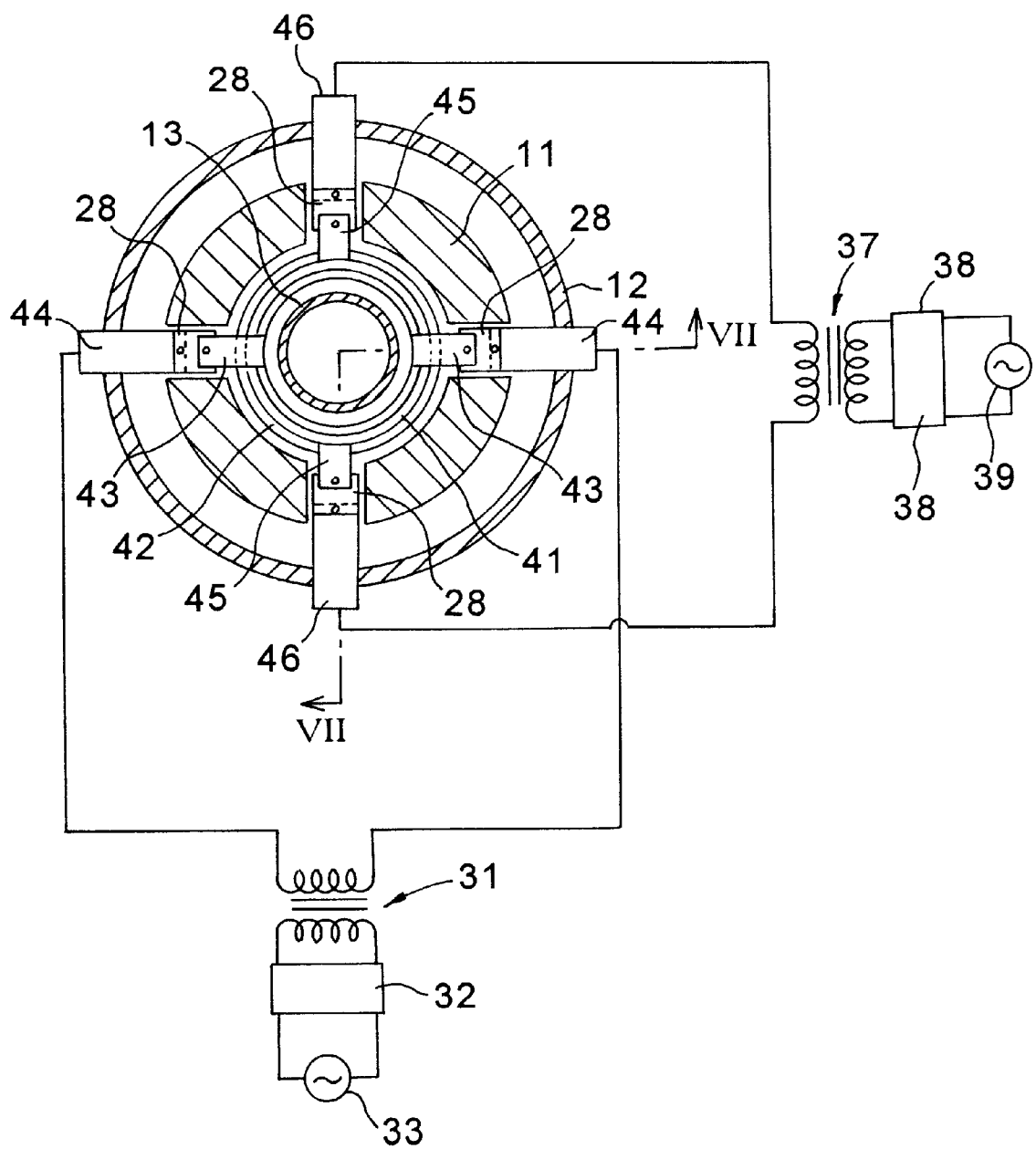
FIG. 8 is a conceptual illustration of the overall optical fiber drawing furnace, along arrow VIII—VIII of FIG. 7.

Next, discussion will be given for the second aspect of the present invention, in which similar affects to the foregoing embodiments by utilizing a plurality of heaters having the identical construction to that employed in the conventional optical fiber drawing furnace. The sectional structure of the third embodiment of the optical fiber drawing furnace corresponding to the second aspect of the present invention is shown in FIG. 7, and the sectional structure as viewed along the arrow VIII—VIII is shown in FIG. 8. It should be noted that respective of functional components similar to the former embodiment will be represented by the same reference numerals and discussion therefore will be neglected in order to keep the disclosure simple enough to facilitate better understanding of the invention.

In the shown embodiment, a cylindrical inner heater 41 located at proximity of the muffle tube 13 and a cylindrical outer heater 42 surrounding the inner heater 41 are arranged coaxially relative to each other. These inner heater 41 and the outer heater 42 are meandered in vertical direction to form the heat generating portion 21 in the cylindrical configuration as a whole.

At the upper end of the inner heater 41, a pair of electrode connecting portions 43 extending radially outward are formed integrally with an angle of 180 degrees interval. A pair of electrodes 44 introduced from the outside of the furnace body 12 are connected the tip ends of these electrode connecting portions 43 via the connecting member 28. These pair of electrodes 44 are connected to a single phase AC power source 31 via the transformer 31 and the power control unit 32. On the other hand, all of the current paths extending from one electrode 44 to the other electrode connecting portion 43, the heating portion 21, the other electrode connecting portion 43 and the connecting member 28, are set to be geometrically symmetric.

On the other hand, at the upper end of the outer heater 42, a pair of electrode connecting portions 45 extending radially outward are formed integrally with an angle of 100 degrees interval. A pair of electrodes 46 introduced from the outside of the furnace body 12 are connected the tip ends of these electrode connecting portions 45 via the connecting member 28. These pair of electrodes 46 are connected to a single phase AC power source 39 via the transformer 31 and a power control unit 38. On the other hand, all of the current paths extending from one electrode 46 to the other electrode 46 via the connecting member 28, one electrode connecting portion 45, the heating portion 21, the other electrode connecting portion 45 and the connecting member 28, are set to be geometrically symmetric.

Namely, as these inner heater 41 and the outer heater 42, the conventionally known heater can be employed as is. However, the opposing direction of the electrode connecting portions 43 of the inner heater 41 and the opposing direction of the electrode connecting portions 45 of the outer heater 42 are set to intersect perpendicularly to each other. Furthermore, the power supply amount for the outer heater 42 which is located far beyond the inner heater 41, can be set to be greater than the power supply amount for the inner heater 4. With this construction, fluctuation of the temperature distribution along the circumference of the muffle tube 13 is canceled to obtain uniform temperature distribution along the circumference of the muffle tube 13 As a result similarly to the foregoing embodiments, the non-circularity ε of the optical fiber can be restricted to be less than or equal to 0.2% through entire length of the optical fiber preform 15.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An optical fiber drawing furnace comprising:
    a muffle tube, into which an optical fiber preform is supplied;
    a cylindrical heater surrounding the muffle tube;
    a pair of support column portions which rise from the upper end of said heater at circumferential positions substantially equidistantly spaced from one another;
    four electrode connecting terminals and no more than four, two electrode connecting terminals extending perpendicularly from each of said support column portions and connecting to one another via a connecting element, the four electrode connecting terminals being arranged so that the angle between the adjacent terminals substantially equals 90°;
    an electric power source connected, via electrodes, to the four electrode connecting terminals; and
    two extension portions protruding upwardly from the heater to balance heat supplied by the pair of support column portions, and being disposed substantially equidistantly between said support column portions.

2. An optical fiber drawing furnace as claimed in claim 1, wherein the cross sectional area of a current path for said heater is varied along circumferential direction of said heater.

3. An optical fiber drawing furnace as claimed in claim 1 wherein said power source is a single phase AC power source.

4. An optical fiber drawing furnace as claimed in claim 1, wherein resistance values of all of current paths between any adjacent two of said electrodes are set to be equal.

5. An optical fiber drawing furnace as claimed in claim 1, wherein said heater is formed of graphite.

6. An optical fiber drawing furnace as claimed in claim 1, wherein each of said connecting elements is quarter circular.

7. An optical fiber drawing furnace as claimed in claim 1, wherein said electrodes are connected to center portions of said connecting elements, respectively.

8. An optical fiber drawing furnace as claimed in claim 1, wherein the non-circularity of the optical fiber over the entire length of the optical fiber preform for the optical fiber is less than 0.2%.

9. An optical drawing furnace as claimed in claim 1, wherein each of the four electrode connecting terminals are disposed substantially equidistantly between one of the support column portions and one of the extension portions.

\* \* \* \* \*